(12) United States Patent
Reh et al.

(10) Patent No.: US 10,566,921 B2
(45) Date of Patent: Feb. 18, 2020

(54) INDUCTION MACHINE HAVING A CUSTOMIZED FIELD-FORMING CURRENT COMPONENT

(71) Applicant: Siemens Aktiengesellschaft, Munich (DE)

(72) Inventors: Joerg Reh, Moehrendorf (DE); Carsten Spindler, Remptendorf (DE); Dietmar Stoiber, Fuerth (DE); Bernd Wedel, Moehrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/019,660

(22) Filed: Jun. 27, 2018

(65) Prior Publication Data
US 2019/0006975 A1    Jan. 3, 2019

(30) Foreign Application Priority Data
Jun. 28, 2017 (EP) ..................................... 17178448

(51) Int. Cl.
| H02P 1/24 | (2006.01) |
| H02P 21/22 | (2016.01) |
| H02P 21/08 | (2016.01) |
| H02P 21/12 | (2016.01) |
| H02P 21/00 | (2016.01) |

(52) U.S. Cl.
CPC .............. *H02P 21/22* (2016.02); *H02P 21/08* (2013.01); *H02P 21/12* (2013.01); *H02P 21/0089* (2013.01)

(58) Field of Classification Search
CPC .............. H02P 3/14; H02P 21/16; H02P 1/42
See application file for complete search history.

(56) References Cited

U.S. PATENT DOCUMENTS

| 4,677,360 A | * | 6/1987 | Garces | .................... H02P 21/09 318/803 |
| 6,965,212 B1 | | 11/2005 | Wang et al. | |
| 2002/0030465 A1 | | 3/2002 | Kato | |
| 2007/0108935 A1 | * | 5/2007 | Iotti | ........................ H02P 6/182 318/772 |
| 2009/0284211 A1 | * | 11/2009 | Gao | ..................... G01R 31/343 318/727 |

FOREIGN PATENT DOCUMENTS

DE    102012107065    2/2014

* cited by examiner

*Primary Examiner* — Karen Masih
(74) *Attorney, Agent, or Firm* — Cozen O'Connor

(57) ABSTRACT

An induction machine includes a stator and a rotor, wherein a stator winding is arranged within the stator, a control device controls a converter such that the converter connects the stator winding to a power-supply network such that a stator current flows within the stator winding, and the stator current has a field-forming current component and a torque-forming current component, where the control device controls the converter such that, during load periods, a torque acts between the stator and the rotor, controls the converter during periods of rest such that a torque acts between the stator and the rotor, controls the converter at least at the beginning of the periods of rest such that the field-forming current component has a nominal value, and controls the converter during the load periods such that the field-forming current component has a lower value than the nominal value.

19 Claims, 4 Drawing Sheets

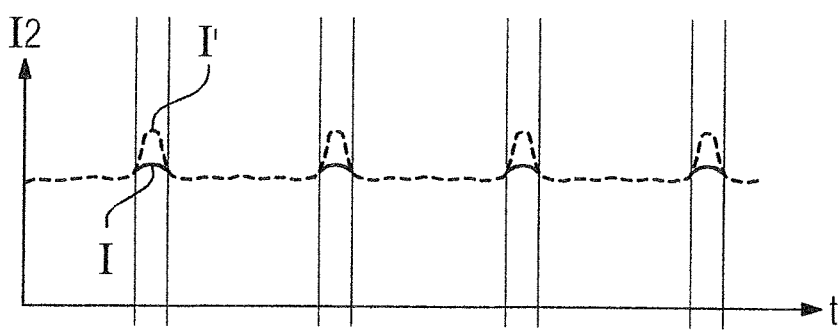
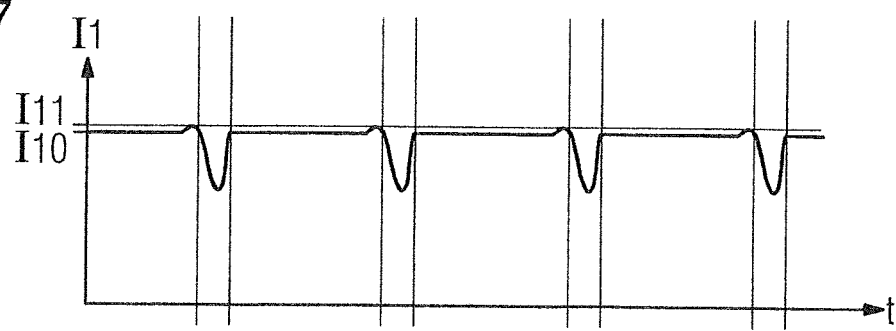
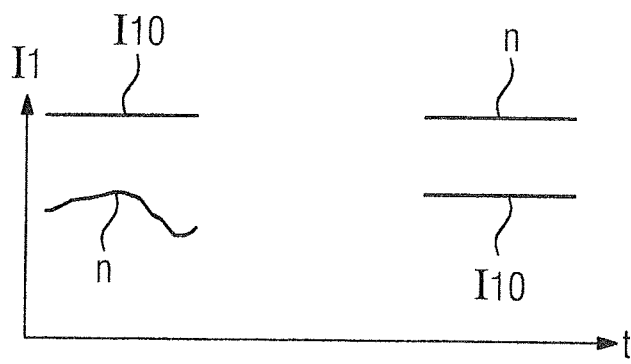

US 10,566,921 B2

INDUCTION MACHINE HAVING A CUSTOMIZED FIELD-FORMING CURRENT COMPONENT

BACKGROUND OF THE INVENTION

1. Field of the Invention

The invention relates to a method for operating an induction machine that has a stator and a rotor, where a stator winding is arranged in the stator, a control device controls a converter so that the converter connects the stator winding to a power-supply network such that a stator current flows within the stator winding. the stator current has a field-forming current component and a torque-forming current component, where the control device controls the converter such that, during load periods, a torque acts between the stator and the rotor, which lies above a predetermined limit torque and its maximum is several times the predetermined limit torque, the load periods are separated from each other by periods of rest, where the control device controls the converter during the periods of rest such that a torque acts between the stator and the rotor, which is under a predetermined limit torque, and where the control device controls the converter at least at the beginning of the periods of rest in such a way that the field-forming current component has a nominal value.

The present invention furthermore relates to a control program comprising machine code, which can be processed by a control device for a converter connecting a stator winding of an induction machine to a power-supply network, where the processing of the machine code by the control device causes the control device to implement such an operating method.

The present invention also relates to a control device for a converter that connects a stator winding of an induction machine to a power-supply network, where the control device is programmed with such a control program so that it performs an operating method during operation.

The present invention also relates to an induction machine, where the induction machine has a stator and a rotor, a stator winding is arranged within the stator, wherein the rotor has a rotor time constant defined by a rotor inductance of the rotor and a rotor resistance of the rotor, wherein a converter is assigned to an induction machine, via which the stator winding can be connected to a power-supply network so that a stator current flows within the stator winding, wherein such a control device is assigned to the converter.

2. Description of the Related Art

Induction machines are mostly used as drives on a motoric level. For example, induction machines can be used in production machines, packaging machines or sheet cutters, and the like. However, they can also be used as generators, whether it be, strictly speaking, as a generator, which is continuously operated on a generative level, or as a drive, which operates on a generative level over the short-term, however, which is normally operated on a motoric level.

In order to operate the induction machine, a stator current is applied to the stator winding via a field-oriented control system, which is, so to say, known. The stator current is composed of the field-forming and the torque-forming current component, where both current components are electrically phase-shifted by 90° with relation to one another.

The field-forming current component (often also referred to as magnetizing current) generates a magnetic flux within the rotor of the induction machine, which generates electromotive force as it interacts with the torque-forming current component. The torque acting between the stator and the rotor (i.e., the electromotive force) is proportional to the product of magnetic flux with the torque-forming current component.

In the most recent background art, the field-forming current component is generally kept constant. An exception applies only above a limit speed. Above the limit speed, the field-forming current component is decreased proportionally to 1/n (with n=speed) so that the terminal voltage of the induction machine does not become too great. In the most recent background art, only the torque-forming current component is varied during normal operation (meaning under the limit speed) to influence the electromotive force. The field-forming current component is only varied if this is mandatorily required due to exceeding the limit speed.

Due to the electrical phase shift of both current components by 90°, the stator current results as the geometrical sum of both current components:

$$I = \sqrt{I1^2 + I2^2} \qquad \text{Eq. (1)}$$

Hereby, I refers to the stator current and I1 refers to the field-forming current component and I2 refers to the torque-forming current component.

The ohmic dissipation in the stator of an induction machine is proportional to the square of the stator current. If the induction machine should be operated with a certain field-forming current component and furthermore, then a certain maximal torque should be able to be emitted, where the induction machine in the most recent background art must be designed for a maximum stator current I in accordance with equation 1. This current is greater than that of both current components I1, I2. Analogously, the converter must be designed for a maximum stator current I in accordance with equation 1.

In many cases, the induction machine is operated such that it must generate a high level of torque for a short period of time (meaning during load periods). Examples include the operation of a press or the short-term acceleration or braking of an axle. During the remaining time (meaning during the periods of rest), on the contrary, the induction machine is described such that it must generate a considerably lower level of torque. Nevertheless, the induction machine and the converter must be designed for the maximum loads.

Due to the short-term high loads, the operating temperature of the power of the converter's semiconductor continues to considerably fluctuate. These temperature fluctuations cause a significant reduction in the lifetime of power semiconductors.

In order to increase the reliability of the converter and the induction machine, the converter and the induction machine are designed to have dimensions that are accordingly large in the most recent background art. Alternatively, it is possible to design the converter to have smaller dimensions, however, having to replace the converter on time in accordance with a preventive maintenance schedule before expected failure.

SUMMARY OF THE INVENTION

It is an object of the present invention is to provide a method via which a converter and an induction machine can be configured with smaller dimensions, thereby maintaining maximum power capacity.

This and other objects and advantages are achieved with the invention by a method for operating an induction machine such that the control device controls the converter during the load periods such that the field-forming current component has a lower value than the nominal value.

The invention is based on the knowledge that the magnetic flux generated in the rotor of the induction machine does not abruptly fall to zero when the field-forming current component decreases, but, for example, (in the case of the field-forming current component fully powering down) only decreases in accordance with the exponential relationship.

$$F(t)=F0 \cdot e^{-t/T} \qquad \text{Eq. (2)}$$

Hereby, F0 is the magnetic flux at the time of the field-forming current component powering down, where t is the time and T is the rotor time constant. Hereby, the rotor time constant T results in the following relationship:

$$T = \frac{LR}{RR} \qquad \text{Eq. (3)}$$

where LR is the inductance of the rotor (rotor inductance) and RR is the resistance of the rotor (rotor resistance). For a brief period of time (for example, the rotor time constant, preferably half of it, a third of it or even a smaller fraction of the rotor time constant) a noteworthy magnetic flux is maintained even without a field-forming current component. Thereby, this "memory effect" can be used to reduce the field-forming current component and, at the same time, it can be used to utilize the current-carrying capacity of the converter becoming available to apply a correspondingly higher torque-forming current component to the stator winding of the induction machine. As a result, it is possible to reach a higher level of torque than would be possible without reducing the field-forming current component for a short time at the same level of the load of the converter and induction machine.

The magnetic flux in the rotor drops during the load periods. It must therefore be built up again during the periods of rest. However, this is generally possible without any problem since, on the one hand, the periods of rest are considerably longer than the load periods and, on the other hand, the torque acting between the stator and the rotor is relatively low most of the time during periods of rest so that only a low torque-forming current component is also required and, in accordance with this, the geometric sum of the torque-forming current component and of the, then higher, field-forming current component remains relatively low during the periods of rest as a result.

Compared with conventional procedures, not only the peak loads can thereby be reduced during the load periods via the method in accordance with the invention (and possible can even be completely eliminated) but, furthermore, the temporal course of the amplitude of the stator current can be evened out overall. This significantly increases the lifetime of the converter's power semiconductor.

It is possible for the control device to control the converter during the load periods such that the field-forming current component assumes the value zero. However, preferably, the control preferably occurs such that the field-forming current component is larger than 0. For example, the control can occur such that the field-forming current component is at a predetermined ratio to the torque-forming current component. This is because, due to the geometrical addition of the current components in accordance with equation 1, a field-forming current component of x %, for example, of the torque-forming current component for an adequately small percentage x in a first approximation only causes an increase in the stator current by $x>^2/2\%$ with reference to the torque-forming current component. If, for example, the field-forming current component is 20% of the torque-forming current component, this only causes a rise in the stator current by 2%. Even maintaining the field-forming current component at 50% of the torque-forming current component only causes a relatively low increase of the stator current with reference to the torque-forming current component, i.e., in a first approximation by 12.5%, precisely calculated, by 11.8%.

In contrast, the reduction of the magnetic flux is also considerably slowed down by maintaining the field-forming current component, even if it is also decreased.

In many cases, the time duration of the respective load period and the respective torque acting between the stator and the rotor during the respective load period are known by the control device in advance. Here, it is possible for the control device to control the converter such that the stator current required to reach the respective torque during the respective load period has a minimum value. With this, the thermal losses in the induction machine can be minimized. In many cases, the temperature fluctuations within the converter can be further reduced.

In some cases, the time duration of the rest period following the respective load period and the respective torque acting between the stator and the rotor during this rest period is known by the control device in advance. Here, it is possible for the control device to control the converter such that a difference is minimized between a maximum stator current occurring during the respective load period and during the following rest period and a minimum stator current occurring during the respective load period and during the following rest period. With this, the temperature fluctuations in the converter can even be further reduced.

In some cases, the point in time the respective next load period begins is known to the control device in advance. Here, it is possible for the control device to increase the field-forming current component to a final value above the nominal value at the end of the respective period of rest, such as during the last 30%, 20%, 10% or an even shorter period of time. With this, despite the reduction of the field-forming current component, during the load period, the short-term (meaning during the respective load period) torque generated by the induction machine is maintained at a high level.

As previously mentioned, the rotor has a rotor time constant defined by a rotor inductance of the rotor and a rotor resistance of the rotor. The load periods preferably have time durations, which are smaller than the rotor time constants, preferably being smaller than half the rotor time constant, in particular, smaller than a third of the rotor time constant. This ensures that, despite the reduction of the field-forming current component, a noteworthy magnetic flux is maintained within the rotor. In contrast, the periods of rest preferably have time durations that are greater than the rotor time constant, preferably greater than two times the rotor time constant and, more preferably, greater than three times the rotor time constant. This ensures that, during periods of rest, there is enough time available for the magnetic flux to be reestablished within the rotor.

Generally, the control device operates the induction machine under its nominal speed, meaning within a speed range, in which the nominal value of the field-forming current component is independent of the speed of the rotor.

Here, the control device alternately operate the induction machine at a constant or a varying speed. If, as an exception, the control device operates the induction machine above its nominal speed, it preferably operates the induction machine within the scope of the operating method in accordance with the invention at a constant speed.

Due to the reduction of the field-forming current component during the load periods, the magnetic flux decreases, even if this is also often only slight or delayed. The torque generated is proportional to the product of the torque-forming current component and the magnetic flux. As a result, the torque-forming current component must therefore be correspondingly increased. In order to set a desired torque-forming in the most reliable and precise manner possible, the control device therefore detects a predominate magnetic flux at least during the load periods and takes the detected magnetic flux into consideration when determining the torque-forming current component.

It is also an object of the invention to provide a control program which, when the machine code of the control program is processed by the control device, causes the control device to perform the method in accordance with the invention.

It is also an object of the invention to provide a control device programmed with a control program in accordance with the invention such that the control device implements the method in accordance with the invention during operation.

It is a further object of the invention to provide an induction machine in which a control device in accordance with the invention is assigned to the converter.

BRIEF DESCRIPTION OF THE DRAWINGS

The characteristics, features and advantages of this invention, as well as the type these are achieved described in the above are explained in a will be explained in clearer and more comprehensible manner in further detail in relation to the following description of the exemplary embodiments and in conjunction with the drawings, in which:

FIGS. 3 to 8 show graphical plots of timing diagrams; and

DETAILED DESCRIPTION OF THE EXEMPLARY EMBODIMENTS

Figure 1:
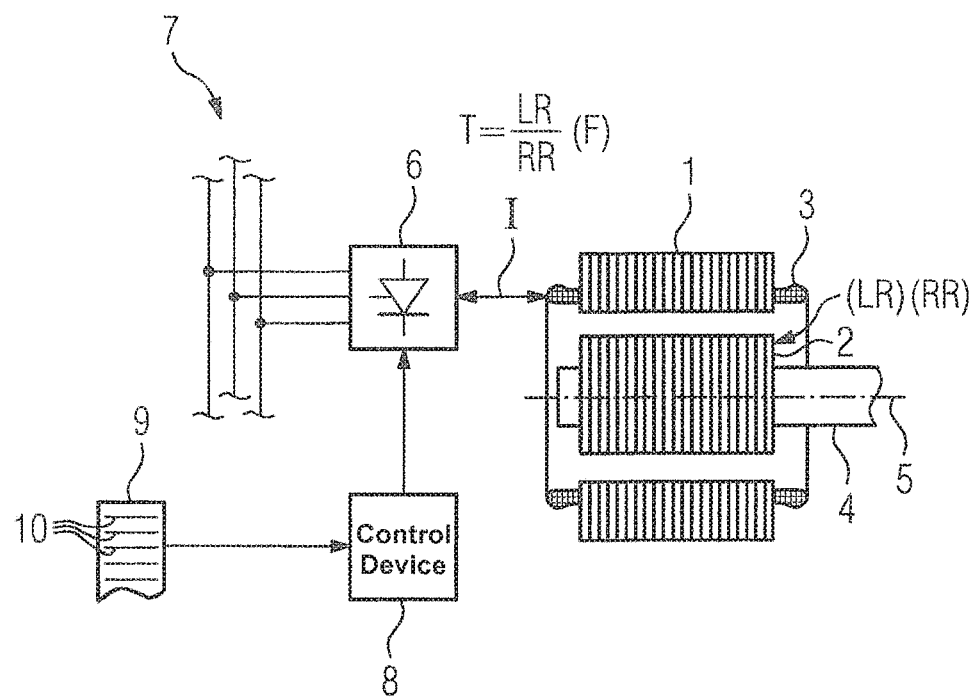
FIG. 1 is a schematic illustration of an induction machine including its connection to a power-supply network in accordance with the invention.

FIG. 1 shows an induction machine having a stator 1 and a rotor 2 in accordance with the invention. A stator winding 3 is arranged within the stator 1. The rotor 2 is arranged on a rotor shaft 4. The rotor shaft 4 is mounted with bearings (not shown) such that the rotor 2 can be rotated relative to the stator 1 around a rotational axis 5. The rotor 2, for its part, has a rotor inductance LR (electrical unit: Henry). Furthermore, the rotor 2 has an electrical resistance RR (electrical unit: ohm). According to the relationship at hand, the quotient of rotor inductance LR and rotor resistance RR defines $$T = \frac{LR}{RR} \qquad \text{Eq. (4)}$$

a rotor time constant T.

A converter 6 is assigned to the induction machine. Via the converter 6, the stator winding 3 can be connected to a power-supply network 7. The power-supply network 7 is generally a three-phase power-supply network. In individual cases, the power-supply network 7 can, however, also be a (single-phase) alternating-current network or a direct-current network. In accordance with the connection of the stator winding 3 to the power-supply network 7, a stator current flows within the stator winding 3. The stator current I is always dependent upon time and is generally a multiphase current.

The converter 6 is controlled via a control device 8 assigned to the converter 6. The control device 8 is programmed with a control program 9. The control program 9 comprises machine code 10, which can be processed by the control device 8. Processing of the machine code 10 by the control device 8 (or the programming of the control device 8 with the control program 9) causes the control device 8 to perform an operating method in accordance with the invention.

Controlling the converter 6 via the control device 8, overall, generally speaking causes the connection of the stator winding 3 to the power-supply network 7 and thereby, the flow of the stator current I into the stator winding 3. The stator current I has a field-forming current component I1 and a torque-forming current component I2 in accordance with the illustration in FIG. 2. The field-forming current component I1 generates a magnetic flux F within the rotor 2 of the induction machine. The torque-forming current component I2 generates a torque M in interaction with the magnetic flux F. The generated torque M is proportional to the product of the torque-forming current component I2 and the magnetic flux F.

Figure 2:
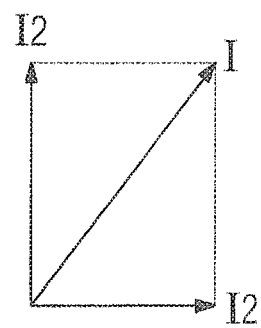
FIG. 2 is an illustration of a current diagram.

Both current components I1, I2 are electrically phase-shifted by 90° against each other in accordance with FIG. 2. Therefore, addition occurs in accordance with the relationship:

$$I = \sqrt{I1^2 + I2^2} \qquad \text{Eq. (5)}$$

to the stator current I. In individual cases, i.e., when one of the two current components I1, I2 is zero, the stator current I corresponds with the remaining current component I1, I2.

Figure 3:
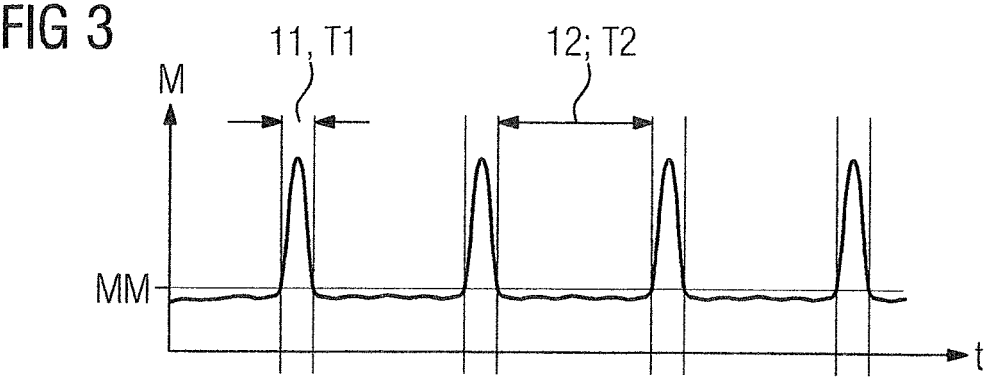

Controlling the converter 6 via the control device 8 as a function of time t, according to the illustration in FIG. 3, often occurs such that the torque M between the stator 1 and the rotor 2 is above a predetermined limit torque MM during load periods 11 (generally continuously), however, at least temporarily. In particular, the maximum torque M within the load periods 11 is several times the predetermined limit torque MM. Thereby, the quotient between the maximum torque M and the predetermined limit torque MM must be this not necessarily integer. It is crucial that the quotient is greater than 2. Often, the quotient is even bigger than 5, sometimes even bigger than 10.

A rest period 12 lies between two immediately consecutive load periods 11. The load periods 11 are separated from each other by periods of rest 12. The control device 8 controls the converter 6 during the periods of rest 12 in such a way that a torque M acts between the stator 1 and the rotor 2, which is (permanently) under a predetermined limit torque MM.

The load periods 11 have first time durations T1. The first time durations T1 are preferably smaller than the rotor time constant T. In particular, the first time durations T1 can be smaller than half of the rotor time constant T, such as smaller than a third of the rotor time constant T. The first time durations T1 of the load periods 11 can even be smaller. The shorter the first time durations T1, the more pulse-like operation of the induction machine there is. The first time durations T1 of the load periods 11 can be identically great among each other.

The load periods 12 have second time durations T2. In contrast, the two time durations T2 are greater than the rotor time constant T. In particular, the second time durations T2 can be greater than two or three times the rotor time constant T. The periods of rest 12 can be even greater. The second time durations T2 of the periods of rest 12 can be identical among each other.

In particular, if both the first time durations T1 are (exactly or considerably) identical among each other, as also the second time durations T2 are (exactly or considerably) identical among each other, cyclic or periodic operation of the induction machine is at hand.

Figure 4:
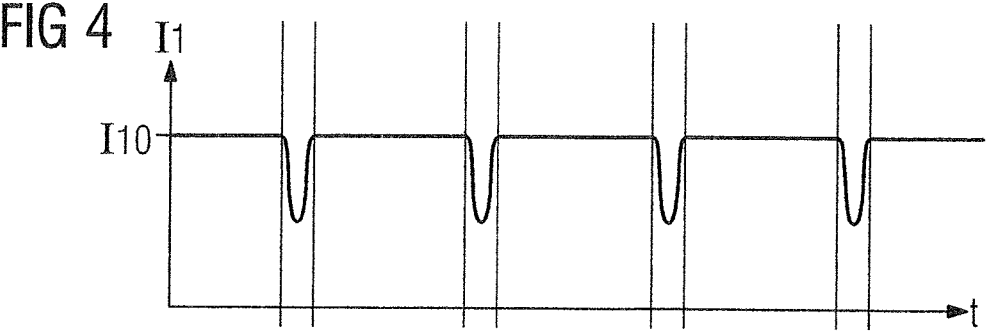

At least at the beginning of the periods of rest 12, as illustrated in FIG. 4 even during the periods of rest 12 in their entirety, the control device 8 controls the converter 6 such that the field-forming current component I1 has a nominal value I10.

Figure 5:

During the load periods 11, as illustrated in FIG. 3, a correspondingly high level of torque M acts between the stator 1 and within the rotor 2. The control device 8 therefore controls the converter 6 illustrated in FIG. 5 such that the torque-forming current component I2 considerably rises. However, at the same time, the control device 8, in accordance with the illustration in FIG. 4, controls the converter 6 such that the field-forming current component I1 has a lower value as the nominal value I10.

If the nominal value I10 is smaller than the value of the torque-forming current component I2 during the respective load period 11, it is possible for the field-forming current component I1 to become reduced to the value 0. Alternatively, in this case, it is possible that the field-forming current component I1 is also greater than 0 in this case. For example, the control device 8 controls the converter 6 during the load periods 11 such that the field-forming current component I1 is at a predetermined ratio to the torque-forming current component I2, such as at 20%, 30%, or 50% of the torque-forming current component I2. On the contrary, if the nominal value I10 is greater than the value of the torque-forming current component I2 during the respective load period 11, then the field-forming current component I1 is preferably reduced to such an extent that the stator current I (or its value) remains constant:

$$I1 = \sqrt{I10^2 + I2^2}$$ Eq. (6)

Independently of which of the mentioned approaches is taken however, in accordance with the illustration in FIG. 6, it can be achieved that the stator current I determined according to the invention fluctuates to a much lesser extent than a stator current I' would occur within the scope of conventional systems.

Depending on the situation of the individual case, various further optimizations of the principle described in the above are possible. In this way, it is, for example possible that the time duration T1 of the respective load period 11 and the respective torque M acting between the stator 1 and the rotor 2 during the respective load period 11 (ideally over the full course of time, at least the maximum however) are known to the control device 8 in advance. Here, the control device 8 can control the converter 6 such that the stator current I required to achieve the respective torque M during the respective load period 11 has a minimum value.

Furthermore, it is possible for the control device 8 to detects the predominate magnetic flux F within the rotor 2 and take the detected magnetic flux F into consideration when detecting the torque-forming current component I2. In particular, the control device 8 can track the torque-forming current component I2 accordingly in the case of a known desired course of the torque M with a varying flow F so that the desired torque M really acts between the stator 1 and the rotor 2 at any time. It is possible to continuously implement this approach, meaning both during the load periods 11 as well as during the periods of rest 12. However, this measure should be taken at least during the load periods 11. Various approaches to determine the magnetic flux F are available to the person skilled in the art. In this way, it is, for example, possible to model the temporal course of the magnetic flux F based on the temporal course of the field-forming current component I1 in conjunction with the known unchangeable factors of the induction machine. As an alternative, it is possible to directly measure the magnetic flux F via a corresponding sensor. In turn, as an alternative, it is possible to capture other electric factors, i.e., the terminal voltages and/or the phase currents of the induction machine and determine the magnetic flux F from these factors. Ideally, the time duration T2 of the rest period 12 following the respective load period 11 and the respective torque acting between the stator 1 and the rotor 2 during the period of rest 12 are also (at least primarily) known to the control device 8 in advance. Here, the control device 8 can control the converter 6 such that a difference is minimized between a maximum stator current I occurring during the respective load period 11 and the following period of rest 12 and a minimum stator current I occurring during the respective load period 11 and the following period of rest 12. In other words: A "period" is deemed to be composed of a load period 11 and a subsequent period of rest 12. During this period, at any time, the stator current I has a maximum value and, at any other time, it has a minimum value. An attempt is made to reduce the difference between the maximum value and the minimum value to such an extent that the span thereof is minimized. A specific example of this approach is the determination in accordance with equation 6, as described in the above.

Furthermore, it is possible for the time of the beginning of the respectively next load period 11 to be known to the control device 8 in advance. Here, as illustrated in FIG. 7, the control device 8 can increase the field-forming current component I1 at the end of the respective period of rest 11 to a final value I11 above the nominal value I10.

Generally, (see the left side of the illustration in FIG. 8) the control device 8 operates the induction machine within a speed range, in which the nominal value I10 is independent of the speed n of the rotor 2. During this operation, (the operation under the nominal speed) the nominal value I10 is constant. This applies independently of whether the speed n of the rotor 2 fluctuates or is constant. As an alternative, (see the right side of the illustration in FIG. 8) the control device 8 can operate the induction machine above the nominal speed, meaning in the field-weakening range. Here, the control device 8 operates the induction machine at the constant speed n.

The present invention has many advantages. In particular, the induction machine including the converter 6 and the control device 8 is smaller in the case of identical power capacity and, therefore, can be implemented more inexpensively than is the case with conventional induction machines. Furthermore, the converter 6 has a greater lifetime (often a considerably greater one).

Figure 9:
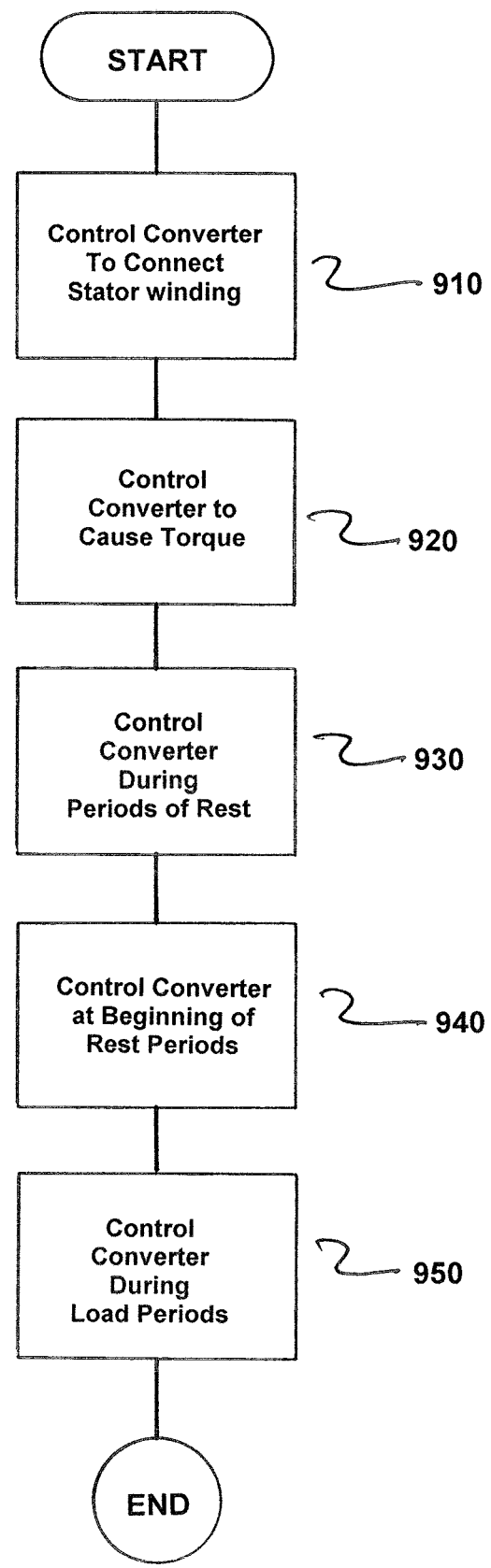
FIG. 9 is a flowchart of the method in accordance with the invention.

FIG. 9 is a flowchart of the method for operating an induction machine having a stator 1 and a rotor 2, where a stator winding 3 is arranged in the stator 1. The method comprises controlling a converter 6 by a control device 8 such that the converter 6 connects the stator winding 3 to a power-supply network 7 such that a stator current I flows within the stator winding 3, as indicated in step 910. In accordance with the invention, the stator current I having a field-forming current component I1 and a torque-forming current component I2.

Next, the converter 6 is controlled by the control device 8 such that, during load periods 11, a torque M acts between the stator 1 and the rotor 2, which lies above a predetermined limit torque MM and its maximum is several times the predetermined limit torque MM, as indicated in step 920. In accordance with the invention, the load periods 11 is separated from each other by periods of rest 12.

Next, the converter 6 is controlled by the control device 8 during the periods of rest 12 such that a torque M acts between the stator 1 and the rotor 2, which is below the predetermined limit torque MM, as indicated in step 930.

The converter 6 is now controlled by the control device 8 at least at a beginning of the periods of rest 12 such that the field-forming current component I1 has a nominal value I10, as indicated in step 940.

Next, the converter 6 is controlled by control device 8 during the load periods 11 such that the field-forming current component I1 has a lower value than the nominal value I10, as indicated in step 950.

Although the invention has been illustrated and described in more detail using the preferred exemplary embodiment, the invention is not limited by the disclosed examples and other variations can be derived by the person skilled in the art therefrom without going beyond the scope of the invention's protection.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an induction machine having a stator and a rotor, a stator winding being arranged in the stator, the method comprising:
   controlling a converter by a control device such that the converter connects the stator winding to a power-supply network such that a stator current flows within the stator winding, the stator current having a field-forming current component and a torque-forming current component;
   controlling the converter by the control device such that, during load periods, a torque acts between the stator and the rotor, which lies above a predetermined limit torque and its maximum is several times the predetermined limit torque, the load periods being separated from each other by periods of rest;
   controlling the converter by the control device during the periods of rest such that a torque acts between the stator and the rotor, which is below the predetermined limit torque;
   controlling the converter by the control device at least at a beginning of the periods of rest such that the field-forming current component has a nominal value; and
   controlling the converter by control device during the load periods such that the field-forming current component has a lower value than the nominal value.

2. The method according to claim 1, wherein the control device controls the converter during the load periods such that the field-forming current component is greater than 0.

3. The method according to claim 2, wherein the control device controls the converter during the load periods such that the field-forming current component is at a predetermined ratio to the torque-forming current component.

4. The method according to claim 1, wherein a time duration of a respective load period and a respective torque acting between the stator and the rotor during the respective load period is known to the control device in advance; and wherein the control device controls the converter such that a stator current required to achieve the respective torque during the respective load period as a minimum value.

5. The method according to claim 2, wherein a time duration of a respective load period and a respective torque acting between the stator and the rotor during the respective load period is known to the control device in advance; and wherein the control device controls the converter such that a stator current required to achieve the respective torque during the respective load period has a minimum value.

6. The method according to claim 3, wherein a time duration of a respective load period and a respective torque acting between the stator and the rotor during the respective load period is known to the control device in advance; and wherein the control device controls the converter such that a stator current required to achieve the respective torque during the respective load period has a minimum value.

7. The method according to claim 4, wherein a time duration of a period of rest following the respective load period and the respective torque acting between the stator and the rotor during this period of rest is known to the control device in advance; and wherein the control device controls the converter such that a difference is minimized between a maximum stator current occurring during the respective load period and the subsequent period of rest of a stator current occurring during the respective load period and the subsequent period of rest.

8. The method according to claim 1, wherein the time of a beginning of a respectively next load period is known to the control device in advance; and wherein the control device increases the field-forming current component to a final value above the nominal value at the end of a respective period of rest.

9. The method according to claim 1, wherein the rotor has a rotor time constant defined by a rotor inductance of the rotor and a rotor resistance of the rotor; and wherein the load periods have time durations, which are small than the rotor time constant (T).

10. The method according to claim 9, wherein the load periods have time durations which are smaller than half of the rotor time constant.

11. The method according to claim 10, wherein the load periods have time durations which are smaller than a third of the rotor time constant.

12. The method according to claim 1, wherein the rotor has a rotor time constant defined by a rotor inductance of the rotor and a rotor resistance of the rotor; and wherein the periods of rest have time durations which are greater than the rotor time constant, preferably greater than double the rotor time constant, more preferably, greater than three times the rotor time constant.

13. The method according to claim 12, wherein the periods of rest have time durations, which are greater than double the rotor time constant, more preferably, greater than three times the rotor time constant.

14. The method according to claim 13, wherein the periods of rest have time durations, which are greater than three times the rotor time constant.

15. The method according to claim 1, wherein the control device operates at least one of (i) the induction machine within a speed range in which the nominal value is independent of a speed (n) of the rotor and (ii) the induction machine at a constant speed.

16. The method according to claim 1, wherein the control device detects a predominate magnetic flux in the rotor during the load periods; and wherein the control device takes the detected magnetic flu into consideration when determining the torque-forming current component.

17. A control device including a control program comprising machine code encoded on the control device for a converter connecting a stator winding of an induction machine to a power-supply network which, when processed by the control device, causes operation of the induction machine, the machine code comprising:
    machine code for controlling the converter such that the converter connects a stator winding to a power-supply network such that a stator current flows within the stator winding, a stator current having a field-forming current component and a torque-forming current component;
    machine code for controlling the converter such that, during load periods, a torque acts between a stator and a rotor, which lies above a predetermined limit torque and its maximum is several times the predetermined limit torque, the load periods being separated from each other by periods of rest;
    machine code for controlling the converter during the periods of rest such that a torque acts between the stator and the rotor, which is below the predetermined limit torque; and
    machine code for controlling the converter at least at a beginning of the periods of rest such that the field-forming current component has a nominal value; and
    machine code for controlling the converter during the load periods such that the field-forming current component has a lower value than the nominal value.

18. A control device for a converter connecting a stator winding of an induction machine to a power-supply network, wherein the control device is programmed with a control program which, when processed by the control device, causes the control device to:
    control the converter such that the converter connects a stator winding to a power-supply network such that a stator current flows within the stator winding, a stator current having a field-forming current component and a torque-forming current component;
    control the converter such that, during load periods, a torque acts between the stator and the rotor, which lies above a predetermined limit torque and its maximum is several times the predetermined limit torque, the load periods being separated from each other by periods of rest;
    control the converter during the periods of rest such that a torque acts between the stator and the rotor, which is below the predetermined limit torque; and
    control the converter at least at a beginning of the periods of rest such that the field-forming current component has a nominal value; and
    control the converter during the load periods such that the field-forming current component has a lower value than the nominal value.

19. An induction machine, comprising:
a stator; and
a rotor having a rotor time constant defined by a rotor inductance of the rotor and a rotor resistance of the rotor, the rotor having:
    a stator winding arranged within the stator;
    a converter assigned to the induction machine, via which the stator winding is connectable to a power-supply network such that a stator current flows within the stator winding; and
    a control device assigned to the converter and programmed with a control program which, when processed by the control device, causes the control device to:
    control the converter such that the converter connects the stator winding to the power-supply network such that the stator current flows within the stator winding, the stator current having a field-forming current component and a torque-forming current component;
    control the converter such that, during load periods, a torque acts between the stator and the rotor, which lies above a predetermined limit torque and its maximum is several times the predetermined limit torque, the load periods being separated from each other by periods of rest;
    control the converter during the periods of rest such that the torque acts between the stator and the rotor, which is below the predetermined limit torque;
    control the converter at least at a beginning of the periods of rest such that the field-forming current component has a nominal value; and
    control the converter during the load periods such that the field-forming current component has a lower value than the nominal value.

* * * * *